United States Patent [19]

Albertsson et al.

[11] Patent Number: 4,950,029
[45] Date of Patent: Aug. 21, 1990

[54] BRAKE CONTROL SYSTEM FOR PREVENTING WHEEL BLOCKING AND/OR SPINNING

[76] Inventors: Tor Albertsson, Norrgården 49, Vallentuna, S-186 00; Thomas Björshammar, Norrbackagatan 8, Stockholm, S-113 41, both of Sweden

[21] Appl. No.: 216,625
[22] PCT Filed: Nov. 6, 1987
[86] PCT No.: PCT/SE87/00521
   § 371 Date: Sep. 7, 1988
   § 102(e) Date: Sep. 7, 1988
[87] PCT Pub. No.: WO88/03489
   PCT Pub. Date: May 19, 1988

[30] Foreign Application Priority Data

Nov. 7, 1986 [SE] Sweden .............................. 8604791

[51] Int. Cl.⁵ .............................................. B60T 8/42
[52] U.S. Cl. .............................. 303/117; 188/181 A; 303/110
[58] Field of Search ................ 188/181 A, 181 T; 303/110, 111, 112, 113, 115, 117, 119

[56] References Cited

U.S. PATENT DOCUMENTS

| | | | |
|---|---|---|---|
| 2,868,338 | 1/1959 | Lucien et al. ............... | 188/181 A |
| 2,963,328 | 12/1960 | Lucien ...................... | 188/181 A X |
| 3,008,548 | 11/1961 | Moyer ....................... | 188/181 T X |
| 3,294,204 | 12/1966 | Zubaty ...................... | 188/181 A |
| 3,386,537 | 6/1968 | Watanabe .................... | 188/181 T |
| 3,574,416 | 4/1971 | Skoyles . | |
| 4,436,348 | 3/1984 | Farr ......................... | 303/115 |
| 4,726,549 | 2/1988 | Dittner et al. ............... | 303/115 |

FOREIGN PATENT DOCUMENTS

| | | |
|---|---|---|
| 0152344 | 8/1985 | European Pat. Off. . |
| 3322422 | 1/1985 | Fed. Rep. of Germany . |
| 3603074 | 3/1987 | Fed. Rep. of Germany . |

*Primary Examiner*—Duane A. Reger
*Attorney, Agent, or Firm*—Shapiro and Shapiro

[57] ABSTRACT

The present invention relates to a brake control system for vehicles with hydraulic brakes, for preventing wheel blocking and/or spinning. The system is characterised in that the brake system is separable, by means of a valve (3), one for each wheel, into a primary circuit (4) and a secondary circuit (5). Sensors (6) are provided on each wheel for sensing the rotational speed thereof. A control device compares the speeds sensed by said sensor. In the event of a sensed abnormal condition (wheel blocking or spinning) of one or more wheels, the control device activates the respective valve. A pressure control system in the respective secondary circuit controls the pressure therein, independently of the pressure in the primary circuit, in order to cancel the abnormal condition of the corresponding wheel.

5 Claims, 5 Drawing Sheets

BRAKE CONTROL SYSTEM FOR PREVENTING WHEEL BLOCKING AND/OR SPINNING

BACKGROUND OF THE INVENTION

The present invention relates to a brake control system for vehicles with hydraulic brakes, for preventing wheel blocking and/or spinning.

Ever since the Maxaret antiblocking brake system was introduced for aircraft and purpose-built vehicles, a great deal of effort has been put into finding a system sufficiently inexpensive to be used in ordinary cars.

The ABS system by Bosch was the first to be used by the motor industry. Since then, further systems have been developed, for example ATE and ALB. The ATE system is the first to be used as factory-assembled equipment and has received lively publicity. Reviewers have been unanimous in nominating the factory-assembled antiblocking brake system the greatest contribution to traffic safety in the last decades.

From a general point of view, the shortcomings of current antiblocking systems therefore have no connection with the proper functioning, but are primarily of a technical and economic character. Current systems are technically highly sophisticated, but are far too expensive to justify installation in existing cars. As optional equipment, such systems cost about SEK. 10,000-25,000, depending upon the type of the system and the make of the car.

SUMMARY OF THE INVENTION

It therefore is the object of this invention to provide an antiblocking brake system which eliminates the above-mentioned shortcomings and still gives the same effect. The system can also be used for controlling wheel spinning.

Briefly, the system comprises a valve unit which is mounted at the brake yoke of a standard brake system and which, when there is a risk of wheel blocking or spinning, separates the brake system into a primary circuit and which a secondary or wheel circuit. A pressure control system is provided for separately controlling the brake pressure in the wheel circuit. The valve unit is activated by means of a sensor which is mounted at the wheel and directly or indirectly controls the function of the valve unit. The pressure in the secondary circuit is controlled by the pressure control system such that, when there is a risk of wheel blocking, the pressure in the secondary circuit is reduced, whereby the wheels are unblocked, and such that, when there is a risk of wheel spinning, the pressure in the secondary circuit is increased, whereby the spinning wheel is braked and the motive power is transmitted to the non-spinning driving wheel. If the valve unit is controlled by rotation indicators on the driving wheels, the valve unit is able, at different wheel speeds, to automatically control the motive power distribution between the wheels.

The system can be combined with power-reducing facilities, such as throttle, fuel and ignition controls, or combinations thereof.

The advantages of the system are that it comprises but few components, is readily mounted in all cars with hydraulic brakes and also is eminently suitable for subsequent installation. The system, does not affect the brake system of the car in the event of a breakdown. The low production cost yields a low-priced product. The system can be used for controlling two or more wheels, as one desires. With minor modifications, the system can also be used for controlling wheel spinning, separately or in combination with the antiblocking system. Because the system comprises but few components of small dimensions, and because alternative drives and control devices can be used, the system is applicable to most cars.

BRIEF DESCRIPTION OF THE DRAWINGS

Preferred embodiments of the invention will now be described with reference to the accompanying drawings in which.

DETAILED DESCRIPTION OF THE INVENTION

Figure 1:
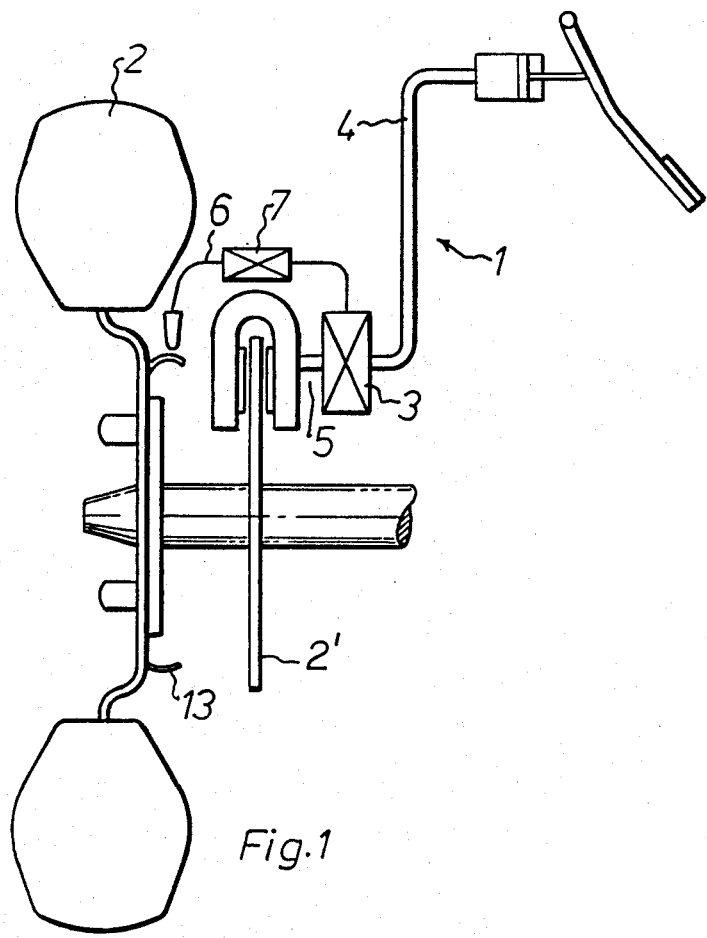
FIG. 1 illustrates schematically part of the brake system of a car, equipped with a brake control system according to the invention.

FIG. 1 illustrates schematically part of the hydraulic brake system of a car, said system being generally designated 1. The Figure shows how the brake control system is mounted in the brake pipe adjacent the brake yoke of a disk brake for a wheel 2. The brake control system comprises a valve 3 which, when actuated, separates the brake system into a primary circuit 4 including the brake pedal, the main cylinder or cylinders, and the brake fluid tank, and a secondary circuit 5 including the wheel cylinder. The valve 3 is activated by a sensor 6 which senses the rotational speed of the wheel, and a control device 7 which compares the instantaneous rotational speed of the wheel with previously sensed values and, in the event of rapid changes, activates the system. In some applications, the control device may also compare the rotational speed of the wheel with an accelerometer built into the car. When an abnormal wheel condition is sensed, i.e. a condition in which the wheel is blocked or spinning, the control device 7 actuates the valve 3 such that a pressure control system in the secondary circuit can control the pressure therein, independently of the pressure in the primary circuit, thereby to cancel the abnormal wheel condition.

Figure 2A:
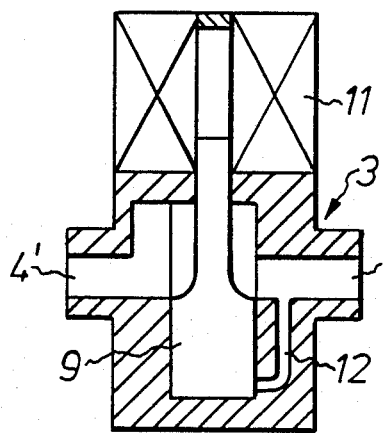
FIGS. 2A and 2B show the valve unit in the deactivated and the activated state, respectively.
Figure 2B:
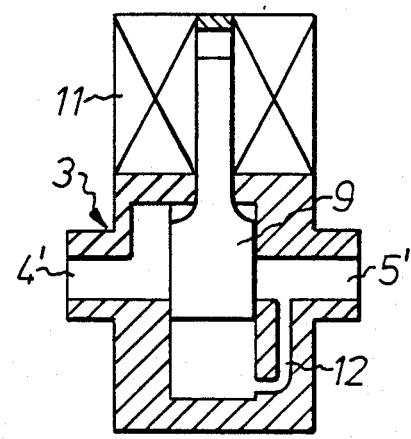

FIGS. 2A and 2B illustrate an embodiment of the valve 3 including a pressure control system. The valve comprises a housing within which a piston 9 is reciprocable. The piston 9 is held by a return spring (not shown) in its normally open position, as shown in FIG. 2A, such that communication is establised between the primary circuit 4 and the secondary circuit 5 by way of ports 4' and 5' of the valve, respectively connected to the primary and secondary circuits. An electromagnet 11 activated by the control device 7 moves the piston 9 to the position shown in FIG. 2B in the drawing, where communication between the primary circuit 4 and the secondary circuit 5 is closed. A connecting pipe 12 connects the secondary circuit 5 to the space which is occupied by the piston in the open valve position. In the activated condition of the valve, i.e. when there is a risk of wheel blocking, the secondary circuit 5 thus is separated from the remainder of the brake system 1, and part of the brake fluid in the secondary circuit will flow through the pipe 12 into the space underneath the piston 9 so that the pressure in the secondary circuit is reduced. Less braking power is thus applied to the wheel which is no longer blocked. When wheel blocking ceases, the valve is deactivated, and the return spring urges the piston back into the open valve position and presses the brake fluid into the brake system which now is open again.

If the valve is inversely connected into the brake system, i.e. if the primary circuit is connected to the valve port 5' and the secondary circuit to the valve port 4', it may also be used for controlling wheel spinning. In this case, when the valve is actuated, the communication between the primary circuit and the secondary circuit is closed, and the continued movement of the piston past the closing position will then press the brake fluid above the piston out into the secondary circuit in which a braking pressure is generated which brakes the wheel. In this manner, the motive power can be transmitted to the non-spinning wheel.

The embodiment illustrated in FIGS. 1 and 2 comprises an inductive sensor 6 which comprises an inductive transducer sensing the rotational speed of the wheel by means of a toothed disk 13 or the like, connected to the wheel. The disk may be mounted between the wheel flange and the wheel hub by means of the wheel fastening bolts or in some similar manner.

Figure 3:
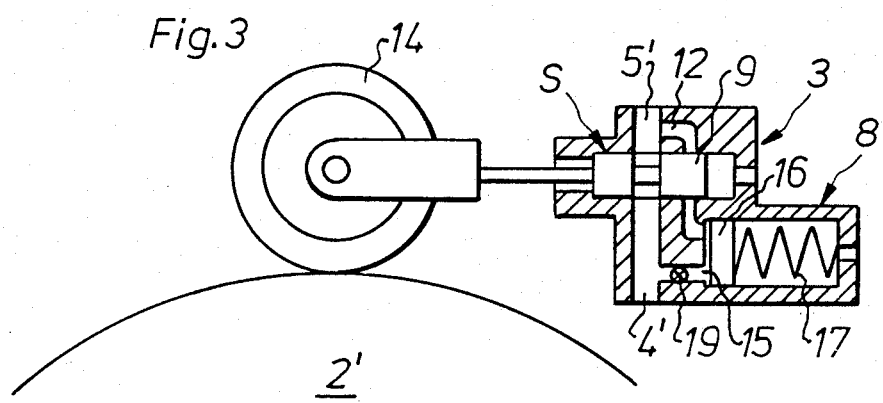
FIG. 3 shows an alternative embodiment of the valve unit, equipped with a pressure control system and a mechanical sensor.

FIG. 3 illustrates an alternative embodiment of the sensor which, in this case, comprises a rotating roller 14 engaging the brake disk 2' or some other part connected to the wheel. The roller 14 is directly and mechanically connected to the piston 9 of the valve 3, the piston 9 being part of a valve spool S in the present example. By selecting a suitable mass for the roller and by applying a suitable pressure against the brake disk, a spontaneous change of the wheel speed will impart to the roller a tractive or compressive force which is sufficient for directly controlling the valve 3.

In this embodiment, the pressure control system, designated 8, comprises a separate cylinder 15 in which a piston 16 is movable. A spring 17 normally keeps the piston in the left-hand position of the drawing. The common valve housing of the valve 3 and the pressure control system 8 comprises a connecting pipe 12 which is normally closed by the piston 9. Upon actuation of the valve 3, the piston 9 opens the pipe 12, while simultaneously closing the communication between the primary circuit 4 and the secondary circuit 5. The pressure in the secondary circuit causes brake fluid to flow through the pipe 12 into the cylinder 15 and to urge the piston 16 to the right against the action of the spring 17. In this case, also a non-return valve 19 is provided between the cylinder 15 and the brake system, whereby the brake fluid can be pressed back into the system when activation of the valve 3 ceases.

Figure 4:
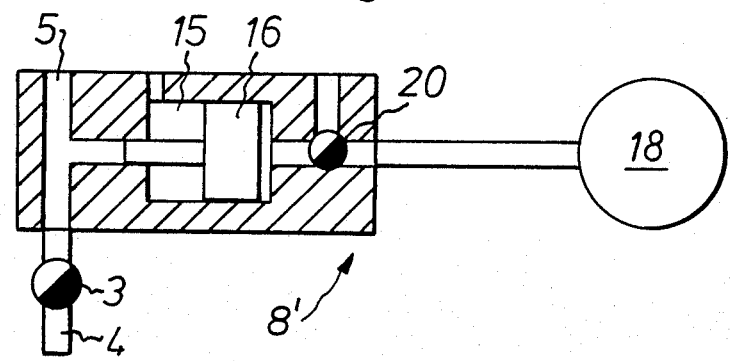
FIG. 4 shows a further alternative embodiment of the pressure control system, equipped with an external pressure source.

FIG. 4 illustrates another embodiment 8' of the pressure control system. In this case, the pressure control system is separate from the valve 3 which is only schematically shown in the drawing, and is connected to the secondary circuit 5. A piston 16 in a cylinder 15 is arranged to control the pressure in the secondary circuit.

In this case, however, an external compressed air source 18 which comprises, for example, a compressor and an accumulator, is adapted to urge the piston to the left in the drawing. A second valve 20, which also is shown only schematically, is adapted to control the communication with the compressed air source 18.

Figure 5:
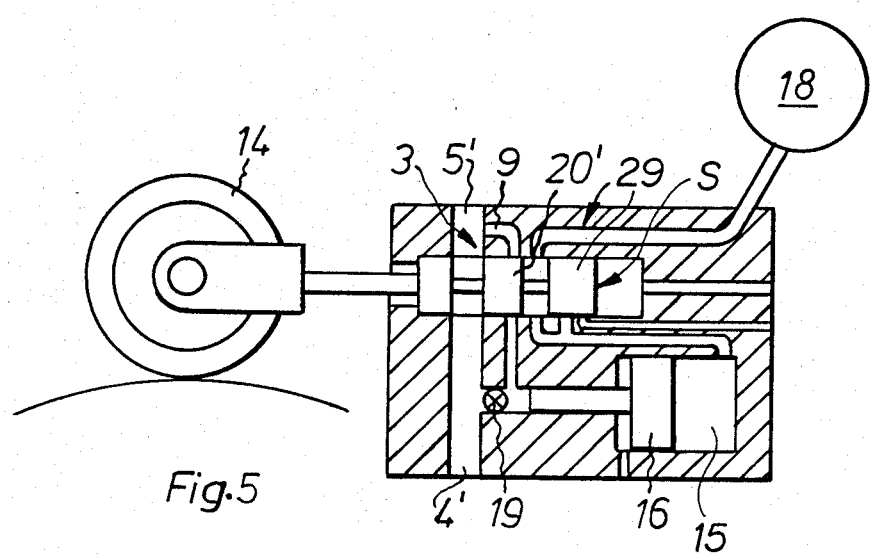
FIG. 5 shows another embodiment of the valve unit and the pressure control system.

FIG. 5 illustrates a further embodiment of the valve and pressure control system 8' are combined in a common housing. In this embodiment, the sensor is the roller 14 which is directly and mechanically connected to the valve spool S'. The spool S' includes the piston 9 of valve 3 and a piston 29 of second valve 20'. Upon actuation of said valves, the pistons move to close the communication between the primary circuit 4 and the secondary circuit 5 through valve ports 4' and 5', to open the connecting pipe 12 and close the connection between the cylinder 15 and the compressed air source 18. Brake fluid will now flow through the pipe 16 and urge the piston 12 to the right in the drawing. When the valves are no longer activated, the compressed air urges the piston 16 to the left, and the piston again presses the brake fluid into the system via the non-return valve 19.

Figure 6:
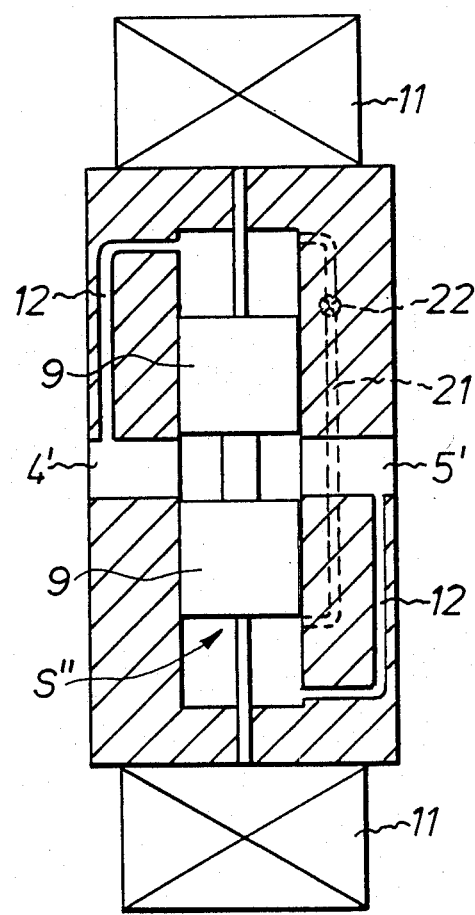
FIG. 6 shows a combined valve unit for wheel blocking control and wheel spinning contol.

FIG. 6 illustrates a further embodiment of the valve unit which, in this case, is a combination of two coupled-together valves according to FIG. 2. The two valves have their respective pistons disposed on a common valve spool S" which is actuated by the respective electromagnets 11 to move upwardly and downwardly within the common valve housing. Upward movement in the drawing, which implies wheel blocking, closes the communication between the primary and secondary circuits 4 and 5 through valve ports 4' and 5' and, as has been mentioned before, the brake fluid in the secondary circuit is urged back into the space beneath the lower piston 9. Similarly, downward movement, which implies wheel spinning, builds up a pressure in the secondary circuit 5, as has also been explained above, and the spinning wheel is retarded.

When the valve is not activated, the valve spool S" is arranged, by means of return springs (not shown), to assume the neutral position shown in the drawing. To facilitate return of the valve spool to neutral position and also to minimize the requisite spring force, a by-pass 21 may be provided in the valve housing. The by-pass 21 opens at the top of the space above upper piston 9 on the primary circuit side and directly below the neutral spool position of lower piston 9 on the secondary circuit side. A pressure-controlled non-return valve 22 in said by-pass allows brake fluid to flow through the by-pass 21 when the valve is no longer activated and facilitates the return stroke of the spool S". This is especially advantageous if the pressure in the primary circuit is low, i.e. if the brake pedal is no longer depressed in which case without the by-pass 21, the pressure within the secondary circuit 5 could prevent the return stroke of the spool S" under the action of the return springs.

In all of the embodiments described above, the various units are, of course, dimensioned such that sufficient brake fluid volumes can be evacuated from and introduced into the secondary circuit in order to provide the requisite pressure reduction or pressure increase and thus control blocking or spinning of the wheels.

Figure 7:
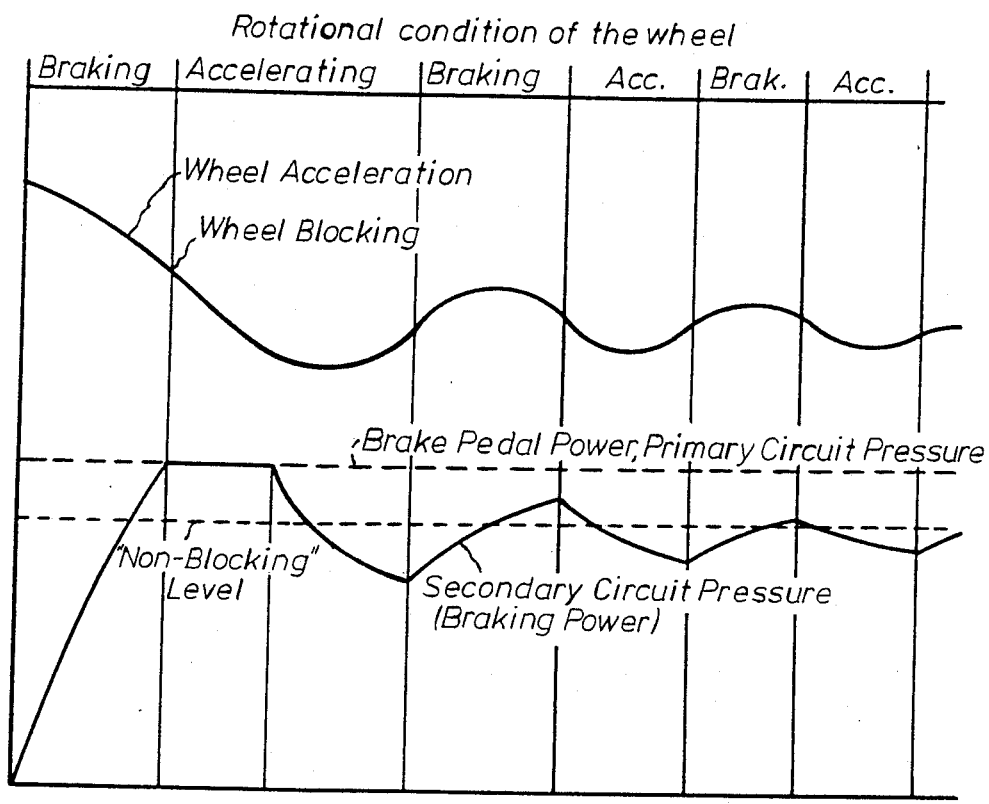
FIG. 7 shows a brake characteristic of a brake control system according to the present invention.

FIG. 7 is an example of a brake characteristic for a brake control system according to the present invention.

It will be appreciated that the invention is not restricted to the embodiments described above and illustrated in the drawings, but may be modified within the scope of the appended claims.

We claim:

1. An anti-blocking anti-spinning hydraulic brake system for vehicles, comprising:

a plurality of wheel brakes, hydraulic brake line means connected to said wheel brakes, means connected to said brake line means for applying hydraulic fluid pressure to said wheel brakes, and for each said wheel brake, means for preventing blocking and spinning of an associated wheel, including means for detecting blocking and spinning conditions of said wheel, a control valve, and means for operating said control valve in accordance with the detected condition of said wheel, said valve having a housing, said housing containing a cylinder, a controlled passageway with primary and secondary sides in communication with each other through said cylinder and connected respectively to said pressure applying means and said wheel brake by way of said brake line means, spool means supported in said cylinder at a neutral position between opposite first and second end volumes of said cylinder and selectively displaceable toward said first end volume to a first position in which said spool means blocks communication between said primary and secondary sides of said controlled passageway and toward said second end volume to a second position in which said spool means blocks communication between said primary and secondary sides of said controlled passageway, first connecting passageway means providing fluid communication between said primary side of said controlled passageway and said first end volume, and second connecting passageway means providing fluid communication between said secondary side of said controlled passageway and said second end volume, whereby when said spool means is displaced from said neutral position to said first position, fluid from said secondary side of said controlled passageway may flow into said second end volume to relieve hydraulic pressure at said wheel brake, and when said spool means is displaced from said neutral position to said second position, fluid may flow from said second end volume into said secondary side of said passageway to apply fluid pressure to said wheel brake, said operating means displacing said spool means from said neutral position to said first position in response to the detection of a blocking condition of said wheel, and displacing said spool means from said neutral position to said second position in response to the detection of a spinning condition of said wheel.

2. A brake system according to claim 1, wherein said housing has a by-pass passageway having a first port opening to said first end volume at a point which is near a corresponding axial end of said spool means when said spool means is in said first position and a port open to said second end volume at a point which is near the opposite axial end of said spool means when said spool means is in said neutral position, and wherein a pressure-controlled non-return valve is disposed in said by-pass passageway for permitting fluid flow from said second end volume to said first end volume.

3. A brake system according to claim 1, wherein said operating means comprises electromagnet means for displacing said spool means.

4. A brake system according to claim 1, wherein said detecting means comprises an inductive transducer which senses a member fixed for rotation with said wheel.

5. A brake system according to claim 1, wherein said spool means is supported in said neutral position by spring means.

* * * * *